United States Patent [19]

Rutledge

[11] 4,398,690
[45] Aug. 16, 1983

[54] ELEVATED SUPPORT FOR PAILS, PAINT TRAYS, AND THE LIKE

[76] Inventor: Wayman R. Rutledge, 300 Fourth Ave., Jonesboro, Ind. 46938

[21] Appl. No.: 274,235

[22] Filed: Jun. 16, 1981

Related U.S. Application Data

[63] Continuation-in-part of Ser. No. 91,177, Nov. 5, 1979, abandoned.

[51] Int. Cl.³ .............................................. A47G 23/02
[52] U.S. Cl. .................................... 248/150; 108/28; 248/154
[58] Field of Search ............... 248/149, 526, 150, 151, 248/210, 211, 509, 500, 154; 15/257.06; 108/28, 32, 90, 30; 211/71, 85, 120, 153; 206/69

[56] References Cited

U.S. PATENT DOCUMENTS

| | | | |
|---|---|---|---|
| 196,396 | 10/1877 | Sprague | 248/154 |
| 579,295 | 3/1897 | Delzell | 248/154 X |
| 781,713 | 2/1905 | Cahill | 248/154 |
| 922,909 | 5/1909 | Jensen | 248/154 X |
| 1,138,141 | 5/1915 | Oliver | 248/154 |
| 1,158,247 | 10/1915 | Lindblom | 248/509 |
| 1,421,724 | 7/1922 | Rugg | 248/150 |
| 1,543,531 | 6/1925 | Streisel | 248/154 |
| 1,590,455 | 6/1926 | Tanron | 108/32 |
| 1,731,139 | 10/1929 | Kift | 248/149 |
| 2,683,553 | 7/1954 | Ariss | 248/154 X |
| 2,694,825 | 11/1954 | Touchett et al. | 15/257.06 |
| 2,727,708 | 12/1955 | Lorenzen | 248/526 |
| 2,761,641 | 9/1956 | Lubbers | 248/526 X |
| 2,891,753 | 6/1959 | Bittle | 248/149 |
| 2,940,708 | 6/1960 | Grimal | 248/168 |
| 2,959,387 | 11/1960 | Ficek | 248/149 |
| 3,045,959 | 7/1962 | Herrington | 248/526 |
| 4,007,901 | 2/1977 | Mancini | 248/526 |

*Primary Examiner*—James T. McCall
*Attorney, Agent, or Firm*—Richard T. Seeger

[57] ABSTRACT

A tripod supported platform has mounted thereon a plurality of arms, each being extensible against the force of a tension spring. The distal ends of the arms are releasably engageable with the rim of a pail or like container for holding the pail on the platform. The arms are removable and the depending brackets adjacent one end of a paint tray may be hooked under the edges of the platform with the other end of the tray overhanging the platform. A retainer is attachable slidably to the platform to permit seating of the tray on the platform and then slidable against the one end of the tray to force the brackets under the platform and securely support the tray on the platform, and to provide for securing different length trays on the platform. One of the tripod legs is pivotable under the platform for storage.

16 Claims, 14 Drawing Figures

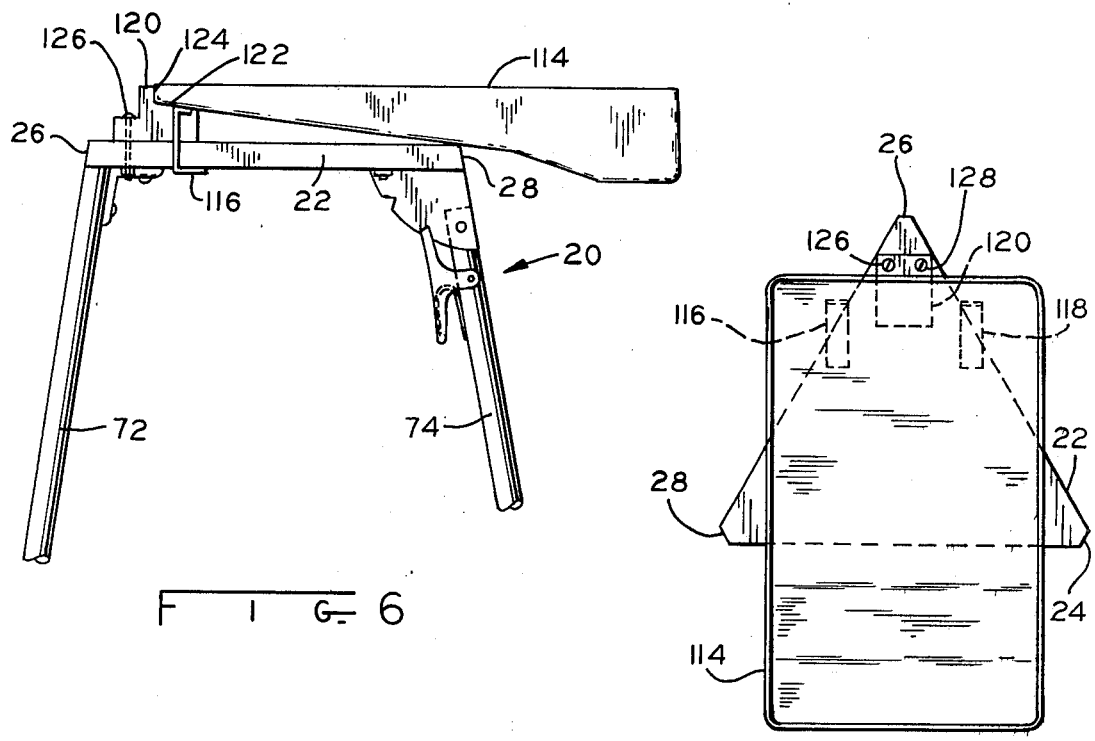
FIG. 6
FIG. 7
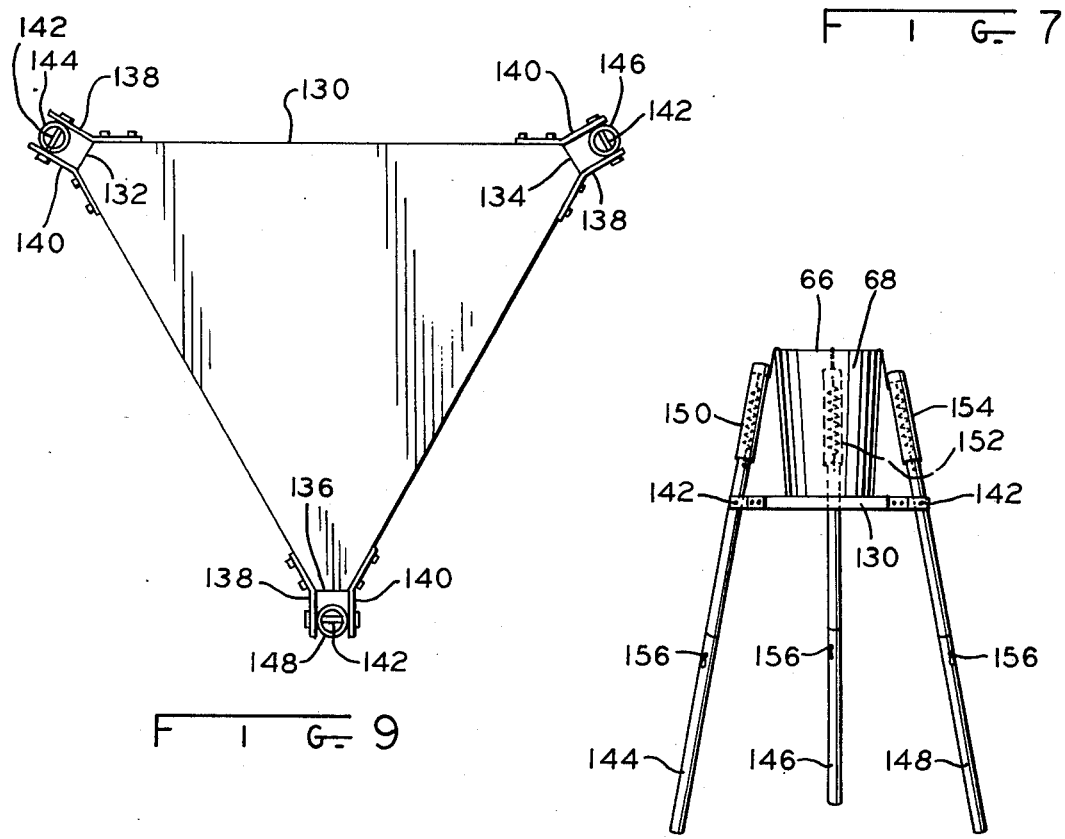
FIG. 9
FIG. 8

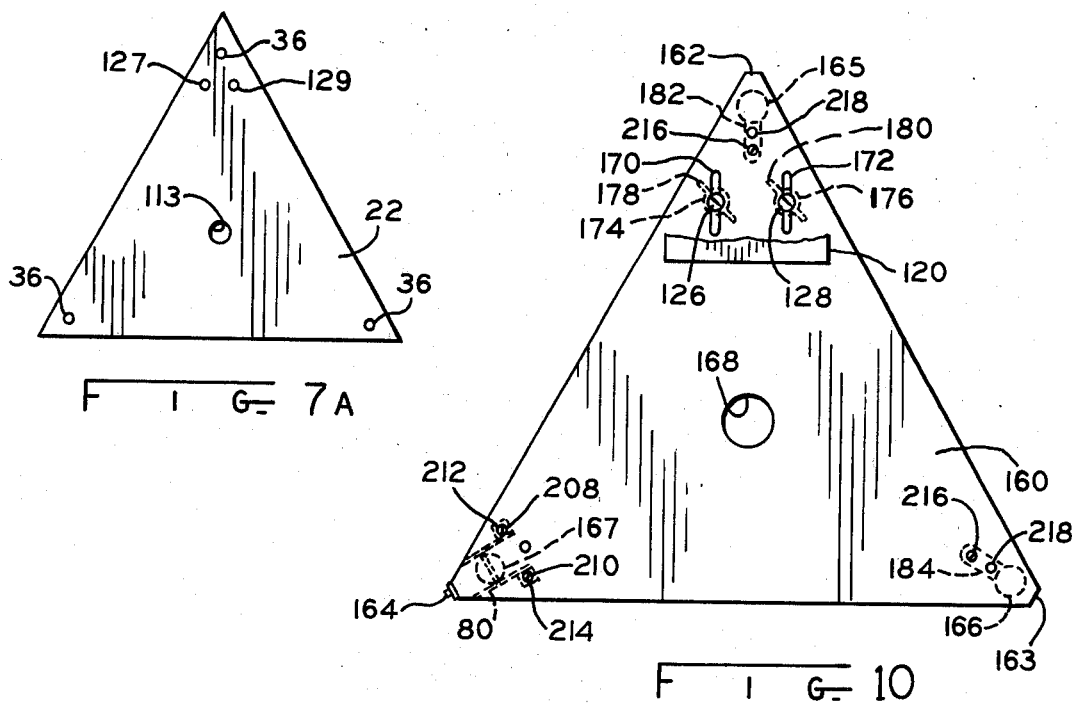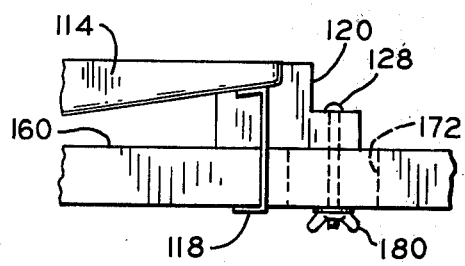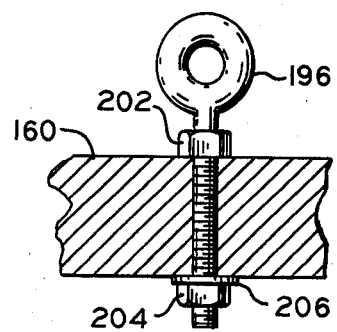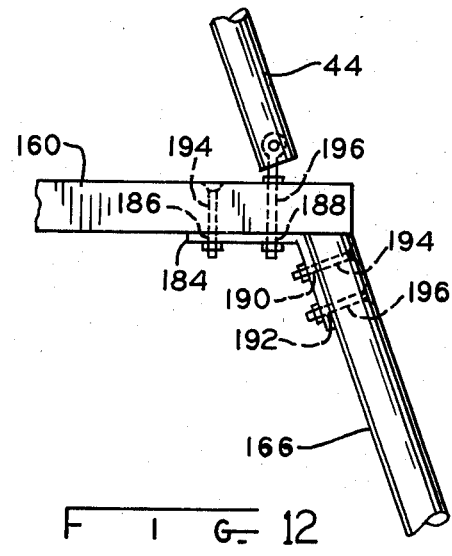

ELEVATED SUPPORT FOR PAILS, PAINT TRAYS, AND THE LIKE

RELATED APPLICATION

This is a continuation-in-part of my copending application Ser. No. 91,177, filed Nov. 5, 1979, entitled "Elevated Support for Pails, Paint Trays, and the Like", now abandoned.

BACKGROUND OF THE INVENTION

1. Field of the Invention

This invention is in the field of elevated supports for releasably holding pails, paint trays, and the like.

2. Description of the Prior Art

Elevated supports for pails and other containers are well known in the art. The convenience of an elevated support has been long recognized and considerable effort has been expanded to devise a support that is versatile in use and convenient to operate. The prior art is exemplified by the following U.S. Pat. Nos. 196,396; 579,295; 781,713; 922,909; 1,138,141; 2,683,553.

Numerous designs have been proposed for holding a container on a stand, or the like, but lack versatility in holding different types of containers, are inconvenient in operation, are expensive in manufacture, or are difficult to store and transport.

SUMMARY OF THE INVENTION

A tripod-supported triangular platform has three telescopic arms pivotably mounted thereon. Each arm is extensible against a tension spring, the distal ends of the arms being provided with a hook for engaging the rim of a container to hold the container to the platform. A spacer block is removably mountable to the platform to accommodate smaller containers such as quart paint cans, small paint buckets, or the like.

The arms are removable from the platform and a paint roller tray having a pair of depending L-shaped brackets adjacent one end of the tray is positioned on the platform so that an apex of the platform is wedged between the brackets, the opposite end of the tray overhanging the platform. A supporting stepped retainer is attachable to the platform and is slidably adjustable towards and away from the one end of the tray, to accommodate different size trays and to facilitate mounting of the trays to the platform. The retainer is slidably adjusted towards and against the one end of the tray, forcing the brackets under the side edges of the platform, and then is fastened to the platform by tightening fastening bolts, to hold the tray securely to the platform.

One of the tripod legs is pivotally mounted to the platform and may be releasably latched in each of a support and a storage position. The other legs are fixed to the platform.

In an alternate embodiment, all three legs are pivotally mounted to the platform and each leg has a portion extending above the platform to which are mounted respective telescoping sleeves. Each of the sleeves is attached to its respective portion by a tension spring and the distal ends of the sleeves carry hooks for placement over the rim of a container to hold the container to the platform. Thus, the legs serve the dual purpose of platform support and container retention. The legs are adjustable in length for varying the elevation of the platform. For storage or transport, the legs may be adjusted to their shortest length and pivoted inwardly under the platform.

It is therefore an object of this invention to provide an elevated support for releasably holding containers of diverse configurations that is convenient in use, readily adjusted for storage or transport, and inexpensive in manufacture.

Another object of this invention is to provide a support that has removable resiliently extensible arms for holding pails and the like and a movable retainer for holding paint roller trays and the like.

A further object is to provide in the support of the previous object a slidable mounting for the retainer to facilitate mounting of the roller trays, and to accommodate trays of diverse dimensions.

Another object of this invention is to provide, in the devices of the previous objects, an adaptor block to adapt the support for containers of various dimensions.

A further object of this invention is to provide a platform support having pivotally mounted legs, the upper assemblies of the legs adapted for engaging the rim of a pail or the like.

The above mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 6 is an enlarged side elevational view of the embodiment of FIG. 1 adapted for supporting a paint roller tray;

FIG. 7 is a partial top plan view of the device of FIG. 6;

FIG. 7A is a top plan view of the platform which may be used with the embodiments of FIGS. 1-7;

FIG. 8 is a side elevational view of a second embodiment of this invention;

FIG. 9 is a partial enlarged top plan view of the embodiment of FIG. 8;

FIG. 10 is a top plan view of a second embodiment of the platform, with the retainer shown broken away;

FIG. 11 is a partial side elevational view of a tray mounted to the platform of FIG. 10;

FIG. 12 is an enlarged partial side elevational view of a further embodiment for affixing a leg to the platform; and FIG. 13 is an enlarged partial side elevational view of the eye bolt of the embodiment of FIG. 12.

DESCRIPTION OF THE PREFERRED EMBODIMENT

Figure 1:
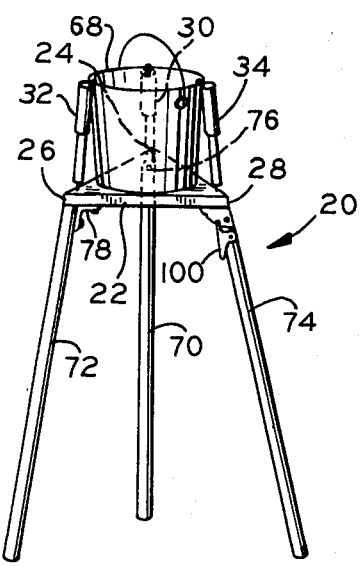
FIG. 1 is a view in perspective of a first embodiment of this invention.
Figure 2:
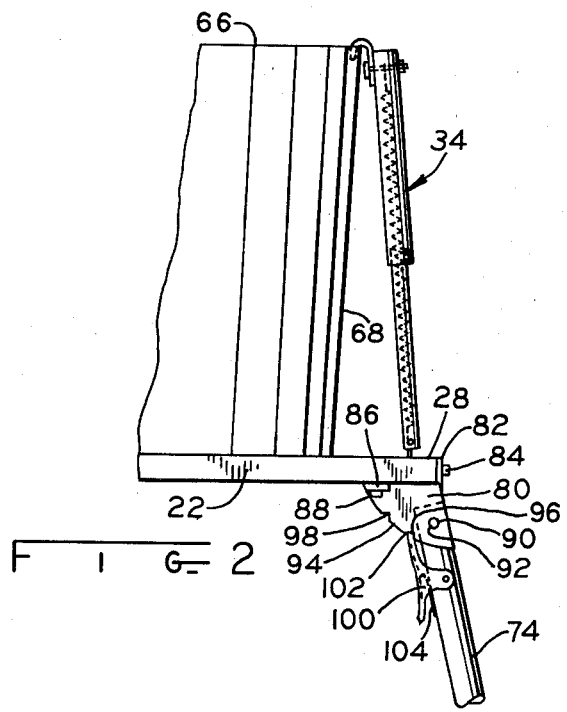
FIG. 2 is an enlarged, broken away, side elevational view of the embodiment of FIG. 1.
Figure 3:
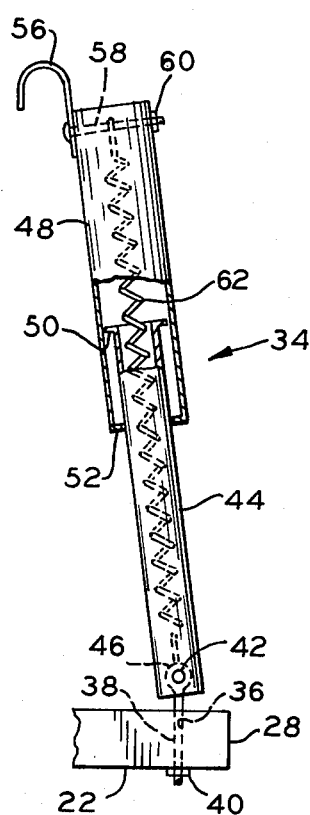
FIG. 3 is an enlarged view of an extensible arm.

Referring to FIGS. 1-3, support 20 has triangular platform 22 provided with apices 24, 26, 28, and may be of a metallic, wood, or plastic material, and in the embodiment of FIGS. 1-3 is wood. Telescopic arms 30, 32, 34 are pivotally mounted to platform 22 adjacent apices 24, 26, 28 respectively, with each arm being mounted and having the construction of arm 34 shown in the enlarged view of FIG. 3. Referring to FIG. 3, hole 36 is formed in platform 22 and, in freely rotative relation, receives the threaded shank of eye bolt 38 having its end threadedly engaged with nut 40 which has a diameter greater than the diameter of hole 36 to block passage therethrough. A pin 42 is secured at its ends across the lower end of tube 44 and is received by eye 46 of bolt 38 in freely pivotal relation. The distal end of tube 44 is telescopically received by sleeve 48 and has an external annular rim 50 formed thereon. Sleeve 48 has an internal annular lip 52 formed at its lower end providing free sliding movement of tube 44 therethrough. Rim 50 seats on lip 52 in the most extended position of tube 44 from sleeve 48 to prevent separation therebetween and possible injury to the user.

Sleeve 48 is provided at its other end with a hook 56 secured by a bolt 58 which passes through diametrally opposed holes across the open end of sleeve 48. Bolt 58 is threadedly engaged with a nut 60 to fasten it in place. A tension spring 62 is hooked at its opposite ends to pin 42 and bolt 58, respectively, to urge tube 44 into sleeve 48 as will be understood by those skilled in the art. Thus, sleeve 48 may be grasped, lifted upwardly, until hook 56 clears the rim 66, FIG. 2, of pail 68 and then lowered over rim 66. The hook of each arm 30, 32, 34 is thusly placed over rim 66 and pail 68 is held in place against platform 22.

Platform 22 is tripod supported by legs 70, 72, 74 at apices 24, 26, 28 respectively. Legs 70, 72 are rigidly attached to platform 22 by angle brackets 76, 78 respectively. Leg 74 is pivotally attached to platform 22 in the following manner. A channeled bracket 80 has an upstanding lip 82 secured to the edge of platform 22 at apex 28, as by screw 84. Bracket 80 has a cross piece 86 extending across the ends of its upper edges which is attached as by screw 88 to the underside of platform 22. A pin 90 is inserted through hole 92 in the upper end of leg 74, thus providing free pivotal movement. Pin 90 is then secured to opposite sides of bracket 80 as by bolting, riveting, or the like. Bracket 80 has a convex arcuate edge 94 with two spaced notches 96, 98 formed thereon. A latch 100 is pivoted at an intermediate point to leg 74 and has tip 102 which is registrable and insertable in notches 96, 98. A compression spring 104 urges latch 100 in a clockwise direction as viewed in FIG. 2. Thus, when tip 102 is in notch 96, leg 74 is releasably held in a supporting position, FIG. 2; when tip 102 is in notch 98, leg 74 is releasably held in a stored position, FIG. 4.

Figure 4:
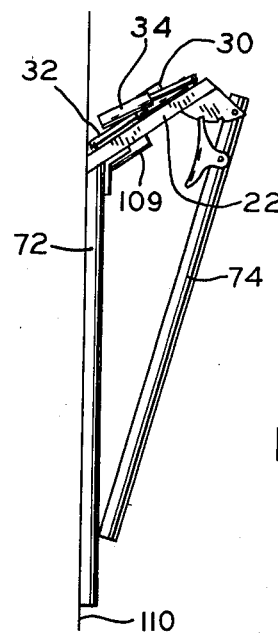
FIG. 4 is a side elevational view of the embodiment of FIG. 1 collapsed for storage.

Referring to FIG. 4, when it is desired to store support 20, arms 30, 32, 34 are released from pail 68, or other container, and pivoted inwardly across the top of platform 22. Latch 100 is pivoted counterclockwise against spring 104, removing tip 102 from notch 96, and leg 74 is swung inwardly until tip 102 engages notch 98, providing compactness for storage or transportation. Support or stool 20 then may be hung over a peg 109 on a wall 110.

Figure 5:
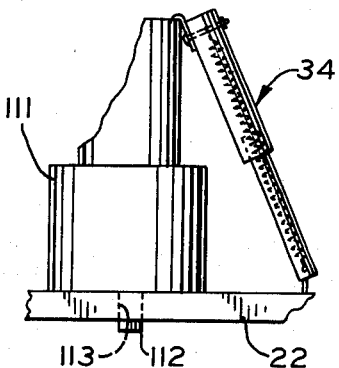
FIG. 5 is an enlarged side elevational, broken away view of the embodiment of FIG. 1 showing a spacer block mounted on the platform.

Referring to FIG. 5, a spacer block 111 has a depending peg or post 112 which is received by a hole 113 in platform 22 to provide a raised platform surface for smaller containers such as plastic paint pails or quart size paint cans. Block 111 dimensions may be varied as appropriate for different size containers.

Referring to FIGS. 6, 7 and 7A, support 20 is shown as adapted for supporting an elongated paint roller tray 114, having a pair of depending laterally spaced L-shaped brackets 116, 118 adjacent one end thereof. Arms 30, 32, 34 are removed by unthreading their respective nuts 40 and tray 114 is moved lengthwise over apex 26 of platform 22 until brackets 116, 118 engage the underside of platform 22. A retainer 120 has step 122 formed therein and is inserted under end 124 of tray 114 providing vertical and horizontal support. Bolts 126, 128 are inserted through respective holes in block 120 and holes 127, 129 in platform 22 and are threadedly engaged with respective nuts to maintain retainer 120 in place. Tray 114 is thus firmly supported on platform 22 for use as a paint roller tray or pan. When not in use, retainer 120 may be inverted and fastened to the underside of platform 22 by bolts 126, 128.

Referring to FIGS. 8 and 9, a further embodiment is shown wherein the tripod legs extend above the platform and thus are also able to serve as the extensible arms. Triangular platform 130 has at each apex 132, 134, 136 a pair of spaced plates 138, 140 attached thereto and extending therefrom for supporting pivot pin 142. Legs 144, 146, 148 each have holes for receiving a respective pin 142 for pivotal support to platform 130. The upper assemblies 150, 152, 154 of legs 144, 146, 148 respectively, are similar in construction to arm 34, FIG. 3, with tube 44 extending below platform 130.

Legs, 144, 146 148 each have telescoping lower portions and wing bolt 156 which may be tightened to frictionally bind the telescoping portions against relative movement and thus maintain the legs in adjusted lengthwise position. When the respective hooks, at the upper ends of legs 144, 146, 148, are placed over the rim 66 of pail 68, to hold the pail against platform 130, the legs are also held in fixed position. After use, pail 68 is removed, as previously described, and the legs may be pivoted inwardly below platform 130 for storage and transportation.

Referring to FIGS. 10–13, triangular platform 160 has apices 162, 163, 164 and is generally similar in function to platform 22, but is of a metallic material. Fixed legs 165, 166 are attached adjacent apices 162, 163, repsectively, and pivotal leg 167 is attached adjacent apex 164. Legs 165, 166, 167 are also of a metallic material. Hole 168 is formed centrally of platform 160 for receiving post 112 of spacer block 111.

Parallel, elongated slots 170, 172 receive bolts 126, 128, respectively, for slidable movement therein. Slots 170, 172 may be in either or both platform 130 and retainer 120. Flat washers 174, 176 are placed over the ends of bolts 126, 128, respectively. The diameters of washers 174, 176 are larger than the widths of slots 170, 172. Wing nuts 178, 180 are threaded over the ends of bolts 126, 128, respectively. Thus, block 120 may be moved towards apex 162 to permit seating of tray 114 on platform 160 and then moved away from apex 162 and against the end of tray 114 to move tray 114 over platform 160, brackets 116, 118 sliding under the side edges of platform 160. Nuts 178, 180 may then be tightened on bolts 126, 128 respectively to releasably clamp tray 114 to platform 160. Also, retainer 120 may be slidingly positioned on platform 160 to accommodate trays of different sizes.

Referring to FIGS. 10, 12, angle brackets 182, 184 are fastened to the underside of platform 160 at apices 162, 163, respectively, and each bracket 182, 184 has four holes 186, 188, 190, 192, for receiving bolts 194, 196, 198, 200, respectively. Bolt 196 is an eye bolt which is threaded along substantially its entire length, nut 202 being threaded on bolt 196 to a position above platform 160, and nut 204 being threaded to a position below platform 160. Lock washer 206 is placed between nut 204 and platform 160. A flat washer may be placed between lock washer 206 and platform 160, which is advantageous if platform 160 is of a wood or softer material.

At apex 164, holes 208, 210 are formed in platform 160 to receive bolts 212, 214 respectively, for holding chanelled bracket 80 to platform 160. Holes 216, 218 are formed in platform 160 at each apex 162, 163 for receiving bolts 194, 196, respectively.

Thus, a support stool is provided for pails and paint trays of many different sizes and proportions, including pails for washing cars and windows, plastic paint pails, or gallon or quart paint cans, and pails for picking fruit and other produce.

While there have been described above the principles of this invention in connection with specific apparatus, it is to be clearly understood that this description is made only by way of example and not as a limitation to the scope of the invention.

What is claimed is:

1. A container support comprising:
   a platform having a top surface;
   a plurality of legs depending from said platform for supporting said platform;
   first means for releasably holding a pail-type container on said surface;
   second means attached to said platform for releasably holding a paint roller tray to said top surface;
   third means for removably attaching said first means to said platform;
   fourth means for movably attaching said second means to said platform.

2. The apparatus of claim 1 wherein one of said legs is pivotally mounted to said platform and having a first pivotal position for supporting said platform and a second pivotal position for storage and transportation; the remaining legs being fixed to said platform.

3. The apparatus of claim 1 wherein said third means comprises a plurality of resiliently extensible elongated arms each having one end removably attachable to said platform; the other ends of said arms being releasably engageable with the rim of a pail-type container to releasably hold the container against the top surface of said platform.

4. The apparatus of claim 3 wherein each of said arms comprises a sleeve having a hook attached at one end and an internal annular rim formed at the other end;
   a tube being reciprocable in each of said cylinders; each of said tubes having at one end an external annular lip seatable on said rim to prevent said tube from exiting from said sleeve other end; the other end of said tube being pivotably attached to said platform;
   a tension spring being within said cylinder and tube and being stretched between said sleeve one end and said tube other end to resiliently urge said tube into said sleeve.

5. The apparatus of claim 1 wherein said second means is slidably attached to said platform for accommodating trays of different sizes and for facilitating tray installation on said platform.

6. The apparatus of claim 1 wherein said second means is removably attached to said platform.

7. The apparatus of claim 1 wherein said second means comprises a retainer having a step formed on one side thereof;
   said tray having transversely spaced depending L-shaped brackets adjacent one end of said tray; each bracket engageable with a respective side edge of said platform and the underside of said platform;
   said retainer being attachable to said platform so that said step is abuttable with said one end of said tray to hold said brackets in engagement with said platform edge and underside of said platform and said retainer being movable relative said platform to permit disengagement of said brackets from said respective edges and underside of said platform for removal of said tray from said platform.

8. The apparatus of claim 7 with said platform being triangular in shape; said brackets being urged against said respective side edges of said platform and underside of said platform when said retainer is attached to said platform adjacent the apex of the angle formed by said respective side edges.

9. The apparatus of claim 7 wherein said second means comprises a pair of elongated slots in at least one of said retainer and said platform; a pair of bolts, a bolt being slidably inserted in each slot and through the other of said retainer and platform, whereby said retainer is slidable relative to said platform and slidable snugly against said one end of said tray; a pair of nuts, a nut being threaded on each of said bolts to hold said retainer in position on said platform.

10. The apparatus of claim 3 with a hole being formed in said platform; a spacer block having a post depending therefrom that is insertable in said hole whereby containers of varying vertical dimensions may be resiliently held by said arms.

11. The apparatus of claim 2 with latching means for latching said one leg in each of the supporting and storage positions.

12. The apparatus of claim 4 including a plurality of eye bolts; each of said eye bolts being inserted through said platform at spaced intervals and having a nut threaded on the eye bolt shank above said platform and a nut threaded on the eye bolt shank below said platform to hold said eye bolt in fixed relation to said platform; the lower ends of each of said springs being attached to a respective eye bolt.

13. A support for an elongated paint roller tray having transversely spaced depending L-shaped brackets adjacent one end thereof;
   a platform having a top surface, at least one of the depending L-shaped brackets engageable with a side edge of said platform and the underside of said platform;
   a plurality of legs depending from said platform for supporting said platform;
   a retainer having a step formed on one side thereof;
   means for movably attaching said retainer to said platform so that said step is abuttable with said one end of said roller tray to hold said at least one bracket in engagement with said platform edge and underside of said platform, and said retainer being movable relative said platform to permit disengagement of said at least one bracket from said edge and underside of said platform for removal of said tray from said platform.

14. The apparatus of claim 13 wherein each of said brackets is engageable with a respective side edge of said platform and underside of said platform.

15. The apparatus of claim 14 wherein said means comprises a pair of elongated slots in one of said retainer and said platform; a pair of bolts, a bolt being slidably inserted in each slot and through the other of said retainer and platform, whereby said retainer is slidable relative to said platform and slidable snugly against said one end of said tray to force said L-shaped brackets against the side edges of and beneath said platform; a pair of fastening members, a member being attached on each of said bolts to hold said retainer in position on said platform.

16. A container support comprising:

a platform having a top surface;

a plurality of legs being pivotally connected at an intermediate point to said platform and having a portion extending below said platform for supporting said platform; each of said legs having a second portion extending above said platform;

means resiliently extensible from each of said portions for releasably engaging the edge defining the container opening to hold the container against said platform and hold said legs in a corresponding pivotal position.

* * * * *